Sept. 20, 1971  R. W. HONATZIS  3,606,432

PROTECTOR STRIP

Filed Dec. 2, 1968

INVENTOR
ROBERT W. HONATZIS
BY
Fetherstonhaugh & Co.
ATTORNEYS

3,606,432
PROTECTOR STRIP
Robert W. Honatzis, 545 W. 10th Ave., Vancouver,
British Columbia, Canada
Filed Dec. 2, 1968, Ser. No. 780,342
Int. Cl. B60r 13/04
U.S. Cl. 293—1                                         1 Claim

ABSTRACT OF THE DISCLOSURE

An automobile protector strip comprising an aluminum extrusion with an insert receiving groove on the side outermost from the vehicle contacting side adapted to form, with the panel of the vehicle to which it is secured, a socket and an end cap for the strip having a plug shaped to be received within the socket.

BACKGROUND OF THE INVENTION

This invention is concerned with a strip for attachment to a surface to protect that surface against damage which might be caused upon impact. It is particularly, but not necessarily exclusively, concerned with a strip for attachment along the side panels of motor vehicles to protect the paintwork of the vehicles from such impacts as those caused by the careless opening of the doors of cars on parking lots.

It is known to provide extruded strips of aluminum pinned or riveted along the side panels of motor vehicles for this purpose. Whilst these strips protect the paint work of the panels, they themselves quickly become scored and dented and so become almost as unsightly as the paint chipped panels. It has also been proposed to provide an extruded strip of rubber or plastic and to secure that to the side panels of a motor car by means of an adhesive but under the rigorous conditions to which these strips are exposed, the adhesive has a somewhat limited life.

Thus it has been proposed to extrude a metal strip with a groove in its outer surface and to press into the groove a resilient plastic or rubber strip. The metal strip can be pinned or riveted or screwed onto the side panels of a motor vehicle and the plastic or rubber strip will absorb the impact without its appearance being unduly marred.

In the past these strips have been made for one or several similar models of motor car and have come in fixed lengths with their ends finished.

BRIEF SUMMARY OF THE INVENTION

The present invention seeks to provide a strip which can be cut to length and attached to any motor vehicle and accordingly the side of the metal strip adapted to contact the panel to be protected is grooved so that when in position on the panel it forms, with the panel, a socket and an end cap is provided which has a correspondingly shaped plug for location in the socket.

Preferably the end cap has a portion overlying the plug which is of similar section to the insert receiving groove of the strip, and more particularly has a similar section to that of the plastic or rubber insert so as to be received in the groove of the metal strip. The overlying portion is inserted into the end of the insert receiving groove and the plug is passed beneath the metal strip firmly to secure the end cap in position.

Preferably the metal strip has two longitudinally extending and transversely spaced grooves and the end cap has a corresponding pair of prongs adapted to fit into those grooves and a web extending between the prongs. The web then aids in anchoring the end cap by providing a tag through which and through the metal strip, a rivet or other fastening means can be passed.

The end caps can be provided in either finished form (for example they may taper smoothly from the end of the extruded metal strip) or they may have an elongated tail which can be cut to size. This is particularly useful when finished, the panels of car doors or the adjacent fender panels where the ends of the strips can not be brought right up to the edges of the panels as clearance is required to open the door.

DESCRIPTION OF THE PREFERRED EMBODIMENTS

Figure 1:
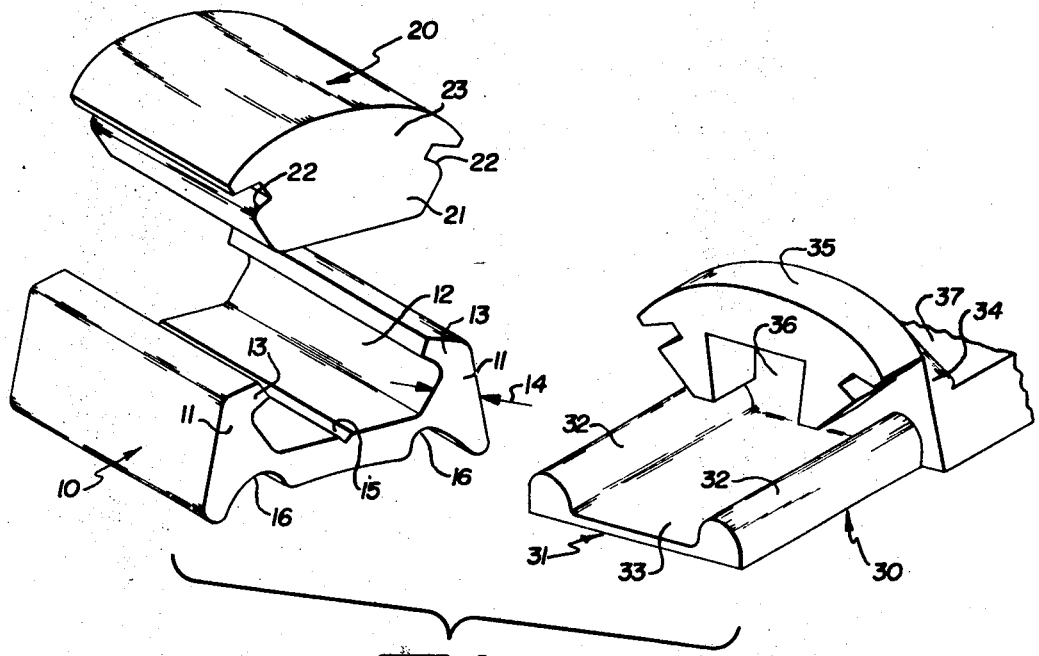
FIG. 1 is an exploded view of a typical end assembly according to this invention.

Throughout the drawings like reference numerals are used to identify like parts.

As will be seen in FIG. 1, the assembly comprises an extruded aluminum strip 10, an extruded plastic insert 20 and a molded end cap 30.

The extrusion 10 has upstanding side walls 11 which define a groove 12 for the reception of the insert 20. The upper edges 13 of the side walls 11 are turned inwardly to securely hold the insert in the manner to be described hereinafter. Towards the base of the side walls, in the region indicated by arrows 14, those side walls have substantial thickness so that the strip can be bent in both the horizontal and vertical planes (as shown in the drawings) without collapse of the side walls so that the groove 12 will maintain its form.

Centrally along the base of the groove 12 a score line 15 is formed. The purpose of this is to assist in drilling the strip to make the attachment holes.

On the underside of the strip a pair of longitudinally extending and transversely spaced grooves 16 are formed. The grooves are slightly spaced inwardly from the side edges of the strip.

Between the adjacent edges of the grooves the underside of the strip is gently curved. In this way the curved shape of a motor car can be accommodated and also a space between the underside of the strip and the panel to which the strip is attached is left for attachment of the end cap as hereinafter described.

It has been found that when the particular form for the undersurface of the strip shown in the drawings is adopted the strip may be located on even sharply curved parts of the vehicle.

The extruded insert 20 is conveniently of plastic material such as polyvinyl chloride but it will be appreciated that any appropriate plastic could be used. The insert has a lower section 21 of substantially similar outline to the groove 12 of the strip 10 so that section may be pressed into the groove and retained therein by shoulders 22 formed on the insert and the upper edges 13 of the strip 10.

The upper section 23 of the insert may take any convenient form and is illustrated in this embodiment as being of part circular outline. It overlies the inwarded directed upper edges of the side walls 11 and effectively absorbs any impacts.

The end cap 30 comprises a plug section generally indicated at 31 which comprises two prongs 32 adapted to be located within the grooves 16 of the extruded strip 10. Extending between the prongs 32 is a web 33 which when the prongs are located in the grooves 16 will lie beneath the curved lower surface of the strip and between that surface and the panel to which the strip is attached.

In practice it may occur that one of the securing holes preformed in the strip along the score line 15 will coincide with the web 33 but if this is not the case then a hole could be drilled in that region so that a rivet or screw can be passed through the base of the groove 12 and through the web 33 thus to firmly secure the end cap in position.

The end cap has a section 34 of which the end view presents an outline similar to that of the stet insert 20 located in groove 12. Projecting forwardly from the section 34 is a section 35 which has a similar section to the section of insert 20 except that it has a recess at its centre portion 36. The recess 36 serves only to assist in the molding operation. The section 35 is pressed into the groove 12 of the extruded strip 10 as the plug 31 is pressed into the socket formed between the lower surfaces of the strip and the panel to which the strip is attached.

The end cap terminates in an elongated tail portion 37 which may be cut to any desired length. This greatly assists the fixing of the strip to panels which are movable relatively to each other on motor vehicles, such as door and fender panels where the edges of the strips on adjacent panels cannot be brought into abutting relationship. It will be appreciated that a space between the strips must be left at the junction of these two adjacent panels to allow them to move relatively to each other. By using an end cap which is of variable length then the need to accurately cut the metal strip is avoided.

Figures 2, 3:
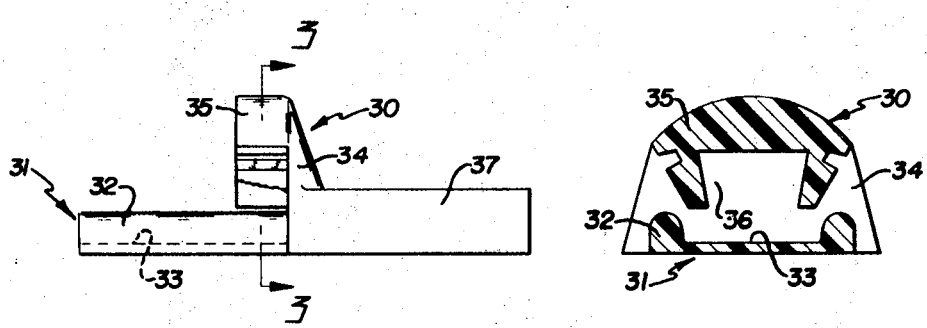
FIG. 2 is a side view of the end cap of FIG. 1.
FIG. 3 is a section on the line 3—3 of FIG. 2.
Figure 4:
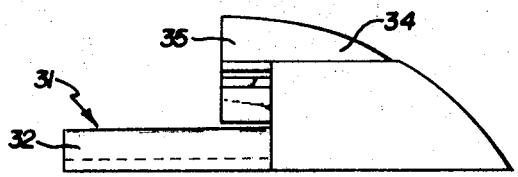
FIG. 4 is a side view of another type of end cap.

In FIG. 4 an end cap of which the interengaging parts are the same as the end cap of FIGS. 1, 2 and 3, is formed into a smooth shape and this sort of end cap would be used upon fixed panels.

It will be appreciated that the present invention provides a simple and convenient device which can be used in conjunction with any length of extruded protector strip so that long strips may be stored and then sold to be cut to length to fit any motor vehicle.

I claim:

1. In combination a protector device comprising an extruded aluminum strip having an insert receiving groove in one side thereof and secured to a surface to be protected with its opposite side contacting that surface, said opposite side having a pair of longitudinally extending and transversely spaced grooves and being recessed longitudinally, between said grooves, a resilient insert located within the insert receiving groove and terminating a short distance from each end of the strip, an end cap at each end of the strip comprising a first portion located within the insert receiving groove and of matching section to the insert, a second portion comprising a pair of prongs and a web interconnecting the prongs, the second portion being located between said opposite side of the strip and the surface to be protected with the prongs received in appropriate ones of the grooves of said opposite side of the strip and the web located within the longitudinally recessed portion of said opposite side of said strip, a third portion interconnecting said first and second portions beyond the end of the strip, said second portion of the end cap being longer than said first portion and being secured to the surface to be protected by a fastening element extending through the strip and through the web of the end cap.

References Cited

UNITED STATES PATENTS

| 3,290,082 | 12/1966 | Fritch | 49—460X |
| 3,451,709 | 6/1969 | Swauger | 293—62X |

FOREIGN PATENTS

| 1,039,729 | 5/1953 | France | 293—54D |

PHILIP GOODMAN, Primary Examiner

U.S. Cl. X.R.

293—62; 52—716